(12) United States Patent
Shah et al.

(10) Patent No.: US 12,381,917 B2
(45) Date of Patent: Aug. 5, 2025

(54) SYSTEMS AND METHODS FOR VALIDATING, MAINTAINING, AND VISUALIZING SECURITY POLICIES

(71) Applicant: Arista Networks, Inc., Santa Clara, CA (US)

(72) Inventors: Sandip Shah, Fremont, CA (US); Robert Ling, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 378 days.

(21) Appl. No.: 17/712,528

(22) Filed: Apr. 4, 2022

(65) Prior Publication Data
US 2023/0319115 A1    Oct. 5, 2023

(51) Int. Cl.
*H04L 29/06* (2006.01)
*H04L 9/40* (2022.01)

(52) U.S. Cl.
CPC .................. *H04L 63/205* (2013.01)

(58) Field of Classification Search
CPC ... H04L 63/205; H04L 41/0894; H04L 63/20; H04L 41/145
See application file for complete search history.

(56) References Cited

U.S. PATENT DOCUMENTS

| | | | |
|---|---|---|---|
| 8,248,958 B1* | 8/2012 | Tulasi | H04L 43/50 370/241 |
| 2007/0157286 A1* | 7/2007 | Singh | H04L 63/20 726/1 |
| 2007/0282981 A1* | 12/2007 | Cohen | H04L 47/2441 709/221 |
| 2008/0022357 A1* | 1/2008 | Agarwal | H04L 63/20 726/1 |
| 2016/0359915 A1* | 12/2016 | Gupta | H04L 43/04 |
| 2016/0366019 A1* | 12/2016 | Pani | H04L 63/20 |
| 2018/0288100 A1* | 10/2018 | Kinder | H04L 63/20 |
| 2019/0089740 A1* | 3/2019 | Hastings | H04L 43/50 |
| 2020/0007583 A1* | 1/2020 | Dixit | H04L 63/102 |
| 2020/0329011 A1* | 10/2020 | Cai | H04L 41/145 |
| 2022/0166756 A1* | 5/2022 | Gupta | H04L 41/16 |
| 2022/0278900 A1* | 9/2022 | Pieczul | H04L 41/22 |
| 2023/0171268 A1* | 6/2023 | Marwah | H04L 63/1433 726/22 |

* cited by examiner

*Primary Examiner* — Yogesh Paliwal
(74) *Attorney, Agent, or Firm* — Fountainhead Law Group, PC

(57) ABSTRACT

A method for updating a policy by a policy manager, that includes selecting, by the policy manager, a policy entry that includes an input and an implementation, performing a validation on the policy entry, making a first determination, based on the validation, that the implementation was not successful, and updating the policy, based on the first determination, to match the input.

20 Claims, 9 Drawing Sheets

Policy Table 820

| Policy Identifier 830 | Source Identifier 832 | Destination Identifier 834 | Input 836 | Implementation 838 | Status 840 |
|---|---|---|---|---|---|
| Policy Entry A 822A | BadIPs | 45.13.13.0/24 | DB_8 | Any traffic, block | Any traffic, block | Success |
| Policy Entry B 822B | Default SSH | Any | VM_1 | SSH traffic, port 22, allow | SSH traffic, port 22, allow | Success |
| Policy Entry C 822C | Analytics Throttle | Analytics | DB_2 | Data, 5MB/s | null | Failed |
| Policy Entry D 822D | DNS Only | All VMs | All DNSs | All ports (ex. 53), reject | All ports (ex. 53), reject | Success |
| Policy Entry E 822E | BlockAppB | AppB | Analytics | Any traffic, block | HTTPS (port 443), block | Failed |
| Policy Entry F 822F | Time Restrict | Client A | Payroll | Any traffic, 8am-5pm, allow | Any traffic, 10pm, allow | Failed |

FIG. 8

SYSTEMS AND METHODS FOR VALIDATING, MAINTAINING, AND VISUALIZING SECURITY POLICIES

BACKGROUND

In some computing environments, there may be a limited ability to manage and validate security policies making it difficult to achieve a desired security practice. In such scenarios, it may be advantageous to introduce components that allow for the easy management and validation of security policies.

BRIEF DESCRIPTION OF DRAWINGS

FIG. 8 shows an example of a policy table, in accordance with one or more embodiments.

DETAILED DESCRIPTION

Figure 1:
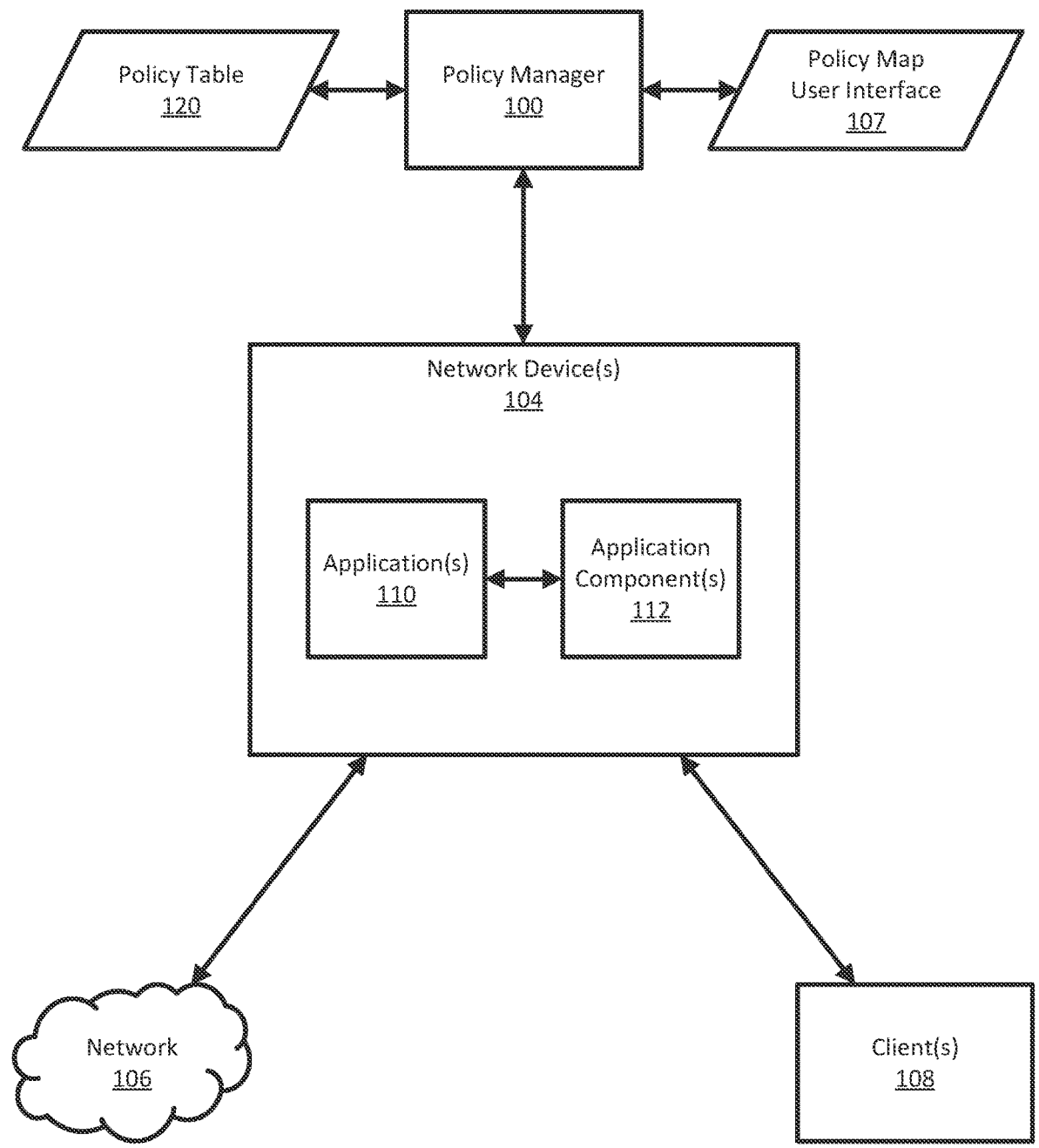
FIG. 1 shows a diagram of a system, in accordance with one or more embodiments.

In conventional networks, policies may be implemented that establish one or more condition(s) for identifying applicable network traffic (i.e., "targeted network traffic) and one or more action(s) to perform on the targeted network traffic (e.g., dropping, blocking, forwarding, copying, monitoring, modifying, and/or otherwise controlling the targeted network traffic). For example, policies may be implemented to restrict network traffic from certain sources, restrict network traffic to certain destinations, limit utilization, allow for network traffic monitoring, and/or perform any other action on the targeted network traffic.

In an ideal scenario, a network administrator configures an application to implement an intended policy and, once configured, the policy is fully effective as an implemented policy. That is, all desired actions are performed on the targeted network traffic (and not performed on non-targeted network traffic). However, although a network administrator may configure an application with the intention of implementing a policy, it may be difficult to ensure that the intended policy is actually implemented and fully effective. Accordingly, it may be desirable to validate (i.e., test, verify, confirm, etc.) the effectiveness of the configuration to ensure the successful implementation of the policy. In one or more embodiments, an intended policy may not be implemented properly (i.e., fail validation) if the submitted configuration is inadequate/incorrect and/or if the configuration is correct but, the configuration failed to be applied to the hardware of the device (i.e., was not properly committed).

To perform these operations and validate the implementation of a policy, a "policy manager" may be employed to monitor targeted network traffic and observe if the policy's actions are performed on the targeted network traffic. In some instances, a policy may be fully validated if the desired actions are performed on the targeted network traffic (and not performed on non-targeted network traffic). In other instances, a policy may be partially effective (e.g., actions are performed on only some of the targeted network traffic) or the policy may be entirely ineffective (e.g., no actions are performed or actions are performed on non-targeted network traffic).

In one or more embodiments, the targeted network traffic, monitored by the policy manager, may be allowed to emanate organically (e.g., be generated, unprovoked, by some device/application connected to the network). Such a validation method may be employed, for example, if the targeted network traffic occurs with relative frequency (e.g., all traffic destined for the internet, originating from a publicly available application). However, if the targeted network traffic appears with less relative frequency, other validation methods may be employed to test the policy. For example, as described in one or more embodiments herein, targeted network traffic may be generated synthetically in order to intentionally induce the actions of the policy. Accordingly, the policy may be validated without having to wait for the targeted network traffic to appear spontaneously.

To perform the validation operations, in one or more embodiments, the policy manager may be configured to generate one or more data structure(s) that includes each of the intended and implemented policies (inputs and implementations). To add (and/or update) the data structures, the policy manager may be configured to read the configurations of existing policies of devices/applications, identify the corresponding intended policy, and identify the implemented policy. Further, the policy manager may allow for the entry of new policies by users—without users directly interacting with the underlying devices.

Further, in one or more embodiments as discussed further herein, the policy manager may generate and present a graphical user interface (GUI) to a user (i.e., a "policy map"), where the policy map provides a visualization of policies in the network (e.g., using a data structure maintained by the policy manager). As a non-limiting example, a policy map may include a visual representation of one or more device(s) (or group of devices) (e.g., shown as boxes) and the flows of network traffic between them (e.g., shown as lines with arrowheads). Further, flows of network traffic may be visually distinct (e.g., colored, dotted, bolded, etc.) to indicate some level of validation (e.g., green for a successful validation, orange for a partial validation, and red for a failed validation).

In an instance where the policy manager identifies a mismatch between an intended policy and an implemented policy, the policy manager may notify a user (e.g., via the GUI, by alert, by email, etc.) that there is a misconfigured policy. Further, as the policy manager allows for a configuration of one or more policies, the policy manager may be configured to fix policies automatically and/or a user may use the policy manager to troubleshoot, update, reconfigure, and validate policies until the user is satisfied with the implemented policies. Ideally, when fully functioning and configured, the intended policies of the network will match the implemented policies of the network. In such an instance, the policy map may reflect that all policies are functioning as intended and no action is required from the user.

In one or more embodiments, as discussed further herein, a policy manager may be employed in a network to help establish and maintain a "zero trust" security model for the network (i.e., where, by default, new devices, applications, and users have no permissions and/or access to any part of the network and all access must be specifically whitelisted). That is, a policy manager may proactively identify policies that conflict with the "zero trust" model and provide recommendations to modify the policies and/or otherwise modify those policies automatically.

FIG. 1 shows a diagram of a system, in accordance with one or more embodiments. The system may include a policy manager (e.g., policy manager (100)), a policy table (e.g., policy table (120)), a policy map user interface (e.g., a policy map user interface (107)), one or more network device(s) (e.g., network device(s) (104)), a network (e.g., network (106)), and one or more client(s) (e.g., client(s) (108)). Each of these components is described below.

In one or more embodiments, a network device (e.g., network device(s) (104)) is a computing device. In one or more embodiments, a computing device is hardware that includes one or more processor(s), memory (volatile and/or non-volatile), persistent storage, internal physical interface(s) (e.g., serial advanced technology attachment (SATA) ports, peripheral component interconnect (PCI) ports, M.2 ports, etc.), external physical interface(s) (e.g., universal serial bus (USB) ports, audio/visual ports, etc.), communication interface(s) (e.g., network ports, small form-factor pluggable (SFP) ports, wireless network devices, etc.), input and output device(s) (e.g., human interface devices), or any combination thereof.

Further, in one or more embodiments, the persistent storage (and/or memory) of the computing device may store computer instructions (e.g., computer code) which, when executed by the processor(s) of the computing device (e.g., as software), cause the computing device to perform one or more processes specified in the computer instructions. Non-limiting examples of a network device include a switch, router, multi-layer switch, and a server. In one or more embodiments, a network device (104) may be executing one or more application(s) that may utilize one or more application component(s) (112).

In one or more embodiments, an application (e.g., application(s) (110), "application software") is software that includes instructions which, when executed by a processor of a network device (104), initiates the performance of one or more specific operations of the network device (104). In one or more embodiments, software is a collection of computer instructions (e.g., computer code) which, when executed by the processor(s) of the computing device, cause the computing device to perform one or more processes specified in the computer instructions. Non-limiting examples of an application (110) that may execute on a network device (104) include database management, a web service, a policy manager (100), and/or any other network related software.

In one or more embodiments, an application component (e.g., application components(s) (112)) is software and/or data that is used by one or more application(s) (110). Application components may include services, data, and/or other sub-applications utilized by the application to perform the operation of the application. Non-limiting examples of application components include a database, an application programming interface (API), a user interface, an analytics engine, etc.

In one or more embodiments, a policy manager (e.g., policy manager (100)) is software executing on a computing device (not shown) that generates a policy table (120) and a policy map user interface (107). Additional details regarding the functionality of the policy manager (100) may be found in FIGS. 4-7.

In one or more embodiments, a policy table (e.g., policy table (120)) is a data structure, stored in the memory/storage of a computing device as generated by the policy manager (100). The policy table (120) may be stored in any computing device, including a computing device that is executing the policy manager (100) or any other device shown in FIG. 1 or any other device operatively connected to any device shown in FIG. 1. Additional details regarding the policy table may be found in the description of FIG. 2.

In one or more embodiments, a policy map user interface (e.g., a policy map user interface (107)) is software executing on a computing device. In one or more embodiments, a policy map user interface (107) may be software that allows one or more user(s) of the computing device to interact, view, and/or modify data stored in the policy table (120). The policy map user interface (107) may be implemented in any computing device, including a computing device that is executing the policy manager (100) or any other device shown in FIG. 1 or any other device operatively connected to any device shown in FIG. 1. Additional details regarding the policy map user interface may be found in the description of FIG. 3.

In one or more embodiments, a client (e.g., client(s) (108)) is a computing device operatively connected to one or more network device(s) (104). Non-limiting examples of a client (108) include a server (e.g., a blade-server in a blade-server chassis, a rack server in a rack, etc.) or a personal computer (e.g., desktop, laptop, tablet, smart phone, personal digital assistant), and/or any other type of computing device that may utilize one or more network device(s).

In one or more embodiments, a network (e.g., network (106)) is a network to which the network device (104) is operatively connected. In one or more embodiments, a network is a collection of connected network devices (104, others not shown) that allows for the communication of data from one network device to other computing device(s) (not shown), or the sharing of resources among network devices. Non-limiting examples of a network include a local area network (LAN), a wide area network (WAN) (e.g., the Internet), a mobile network, or any other type of network that allows for the communication of data and sharing of resources among network devices and/or computing devices operatively connected to the network. One of ordinary skill in the art, having the benefit of this detailed description, would appreciate that a network is a collection of operatively connected computing devices that enables communication between those devices.

While FIG. 1 shows a specific configuration of a system, other configurations may be used without departing from the scope. Accordingly, embodiments disclosed herein should not be limited to the configuration of devices and/or components shown in FIG. 1.

Figure 2:
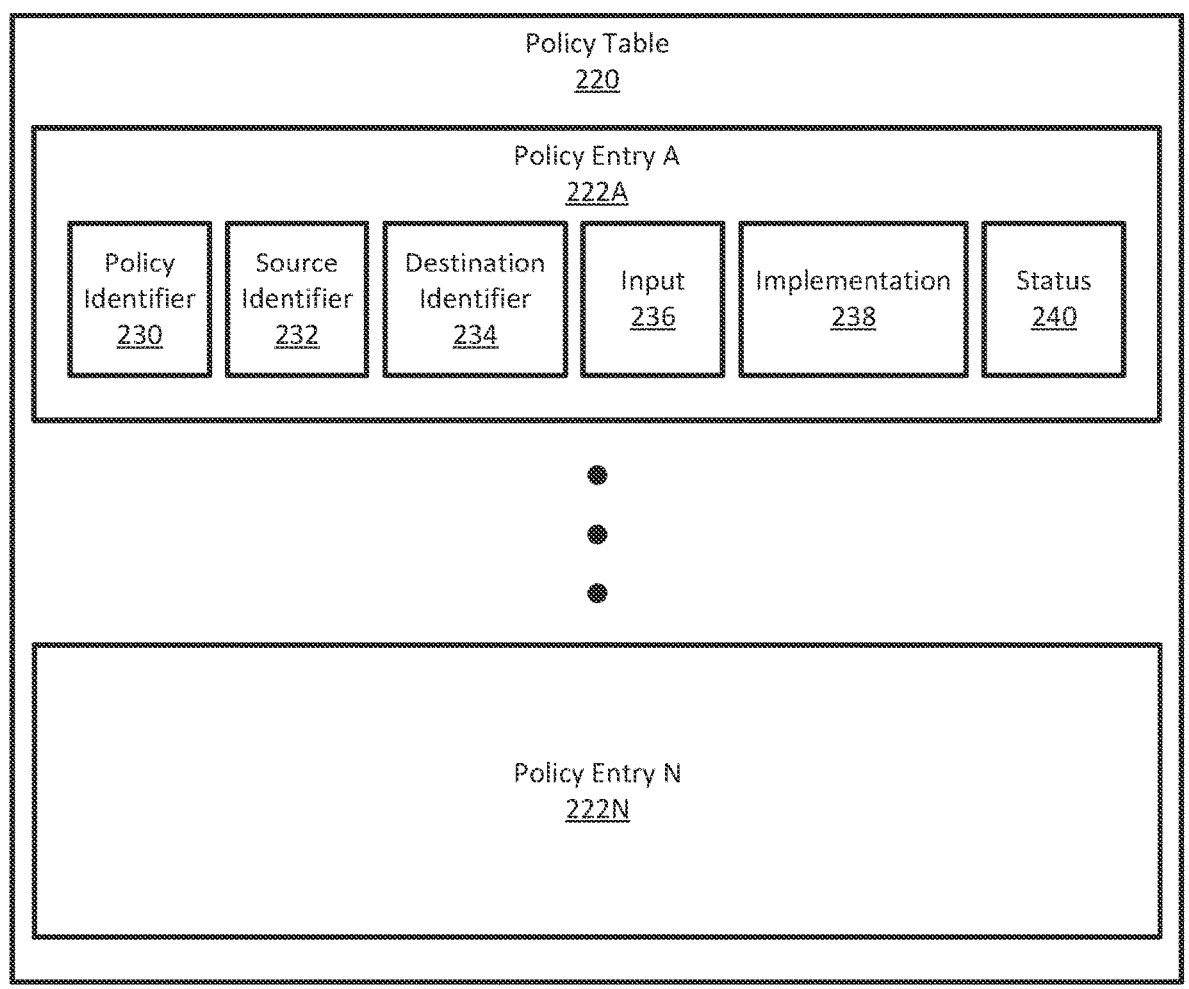
FIG. 2 shows a diagram of a policy table, in accordance with one or more embodiments.

FIG. 2 shows a diagram of a policy table, in accordance with one or more embodiments. A policy table (e.g., policy table (220)) is a data structure, stored in the memory/storage of a computing device as generated by the policy manager. The policy table (220) may include one or more policy entries (e.g., policy entry A (222A), policy entry N (222N)). Each of these components is described below.

In one or more embodiments, a policy entry (e.g., policy entry A (222A), policy entry N (222N)) is a data structure that includes data relevant to one policy. A policy entry (222)

may include a policy identifier (230), a source identifier (232), a destination identifier (234), an input (236), an implementation (238), and a status (240). Each of these components is described below.

In one or more embodiments, an alphanumeric expression is a string of one or more letter(s), number(s), symbol(s), and/or other character(s). An alphanumeric expression may be encoded using a standard protocol for digital characters (e.g., Unicode, American Standard Code for Information Interchange (ASCII), etc.). In one or more embodiments, an alphanumeric expression may be provided by a user and uniquely identify the associated data to one or more users (e.g., "vol_4", "engineering", "sales_east", etc.). In one or more embodiments, an alphanumeric expression may be automatically generated by one or more computing devices (e.g., "system1", "path_A", "StorDev5"). One of ordinary skill in the art, having the benefit of this detailed description, would appreciate that there are many possible variations of alphanumeric expressions.

In one or more embodiments, a policy identifier (e.g., policy identifier (230)) is an alphanumeric expression that is uniquely associated with a policy.

In one or more embodiments, a source identifier (e.g., source identifier (232)) is an alphanumeric expression that is uniquely associated with a single entity (e.g., those shown in FIG. 1, a network device, an application, an application component, a network, a client, etc.).

In one or more embodiments, a destination identifier (e.g., destination identifier (234)) is an alphanumeric express that is uniquely associated with a single entity (e.g., those shown in FIG. 1, a network device, an application, an application component, a network, a client, etc.).

In one or more embodiments, an input (e.g., input (236)) is policy data that specifies one or more condition(s) to identify applicable network traffic (i.e., "targeted network traffic") and one or more desired action(s) to be performed on the targeted network traffic. In one or more embodiments, the input (236) is based on user input into the application and/or policy map user interface (and not the actual configuration that was applied to the application). Within the policy entry (222), the condition(s) of the input apply to the source and destination entities (those indicated by the source identifier (232) and destination identifier (234), respectively). Non-limiting examples of a condition include an internet protocol (IP) address, a media access control (MAC) address, a protocol, a port, etc.

A non-limiting example of an input (236) is (i) an action to block all network traffic and (ii) a condition of network traffic from "Client Z" (the source identifier (232)) to "Database R" of the application (the destination identifier (234)). Accordingly, the policy input (236) is to "block Client Z from accessing Database R" (the condition and the action).

In one or more embodiments, an implementation (e.g., implementation (238)), like an input (236), is policy data that specifies one or more condition(s) to identify applicable network traffic and one or more desired action(s) to be performed on the targeted network traffic. However, the implementation (238) is read from the actual configuration of the application (and not from user input). Continuing with the example above, the implementation may be identical to the input (e.g., "block Client Z from accessing Database R"), or the implementation may differ (e.g., "block Client Z1 from accessing Database R").

In one or more embodiments, an implementation (238) may not include a condition, action, or both. As a non-limiting example, if the policy failed to be implemented, the implementation (238) could be empty/null/not found data, or the implementation may include an error (e.g., "write error") that indicates the policy failed to be implemented. In one or more embodiments, the implementation (238) may be determined by observing targeted network traffic to see if the action(s) of the input are properly enforced upon the target network traffic. Once observed, the implementation (238) may be induced based on the results of the observation.

In one or more embodiments, a status (e.g., status (240)) is an alphanumeric expression that indicates a level of similarity between the input (236) and the implementation (238). In one or more embodiments, if the input (236) and the implementation (238) match (i.e., the desired policy action(s) are sufficiently similar to the policy configuration of the network device), the status may be a "success status" and have a value of "Success", "Active", "Properly Configured", a check mark, and/or any other alphanumeric expression that indicates the successful implementation of the policy. In one or more embodiments, if the status is a success status, the policy associated with the policy entry is considered "valid" and/or "validated".

In one or more embodiments, if the input and the implementation do not match (i.e., the desired policy action(s) do not match the policy configuration of the network device), the status may be a "failed status" and have a value of "Fail(ed)", "Inactive", "Improperly Configured", an "X" mark, and/or any other alphanumeric expression that indicates a failed implementation of the policy. In one or more embodiments, if the status is a failed status, the policy associated with the policy entry is considered "invalid".

While FIG. 2 shows a specific configuration of a system, other configurations may be used without departing from the scope. Accordingly, embodiments disclosed herein should not be limited to the configuration of devices and/or components shown in FIG. 2.

Figure 3:
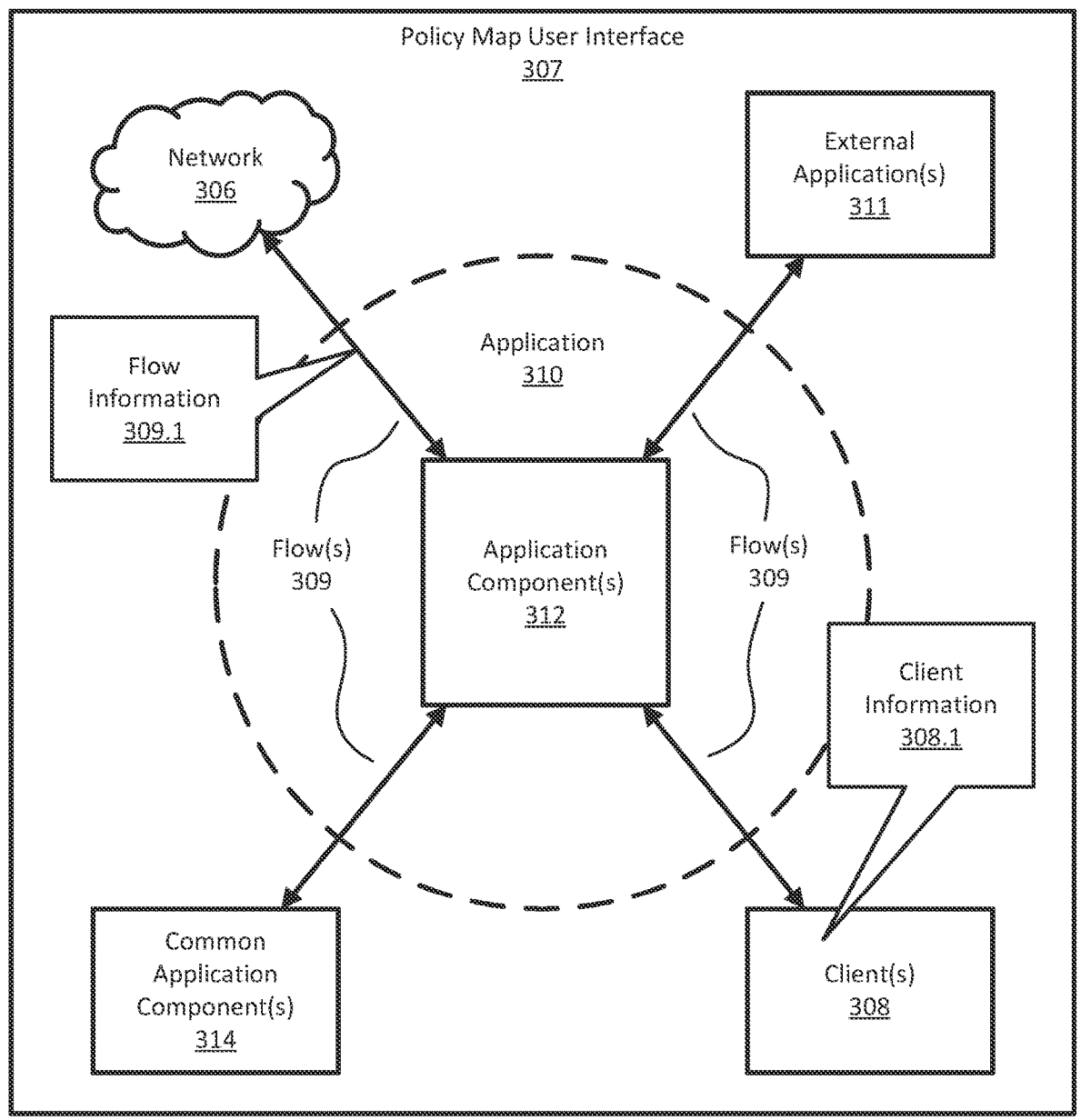
FIG. 3 shows a diagram of a policy map user interface, in accordance with one or more embodiments.

FIG. 3 shows a diagram of a policy map user interface, in accordance with one or more embodiments. In one or more embodiments, a policy map user interface (e.g., policy map user interface (307)) is software executing on a computing device. In one or more embodiments, a policy map user interface (307) may be software that provides an interactive visual user interface of the data maintained in a policy table. Accordingly, in one or more embodiments, the components of the policy map user interface (307) are not the physical/software/data components shown in FIG. 1, but are visual representations of those similarly-named components. However, for compactness and to avoid repetitive terminology, the descriptor "visual representation of" is excluded from FIG. 3 and the discussion herein.

In one or more embodiments, a policy map user interface (307) provides a visual representation of an application (310) and the application component(s) (312) used therein. Additionally, a network (306), one or more external application(s) (311), one or more common application component(s) (314), and one or more client(s) (308) may be displayed around the application (310). Lastly, flow(s) (309) may exist providing a visual representation of an operative connection from one or more application component(s) (312) to other application component(s) (312) (not shown) or to surrounding entities (306, 311, 308, 314). Each of these components is described below.

In one or more embodiments, an "application" (e.g., application (310)) is a visual representation of application software (as discussed in the description of FIG. 1). As shown in FIG. 3, the application (310) is shown as utilizing one or more application component(s) (312) (anything inside the dotted circle). Further, as shown in FIG. 3, a policy map user interface (307) may center (or otherwise focus) on a single application (310) and the flow(s) (309) that connect the application component(s) (312) therein with each other and other components of the system (e.g., network (306), client(s) (308), etc.). As an example, a flow (not shown) may exist between a client (308) and an external application (311), however that flow is not shown (on this policy map user interface (307)) as only flow(s) (309) relating to application (310) are depicted.

In one or more embodiments, an application component (e.g., application component(s) (312)) is a visual representation of application component(s) utilized by the application software. As shown in FIG. 3, the application component(s) (312) inside the application (310) may be exclusively utilized by the application (310) whereas common application component(s) (314) may be used by the application (310) as well as other external application(s) (311) (e.g., available system-wide).

In one or more embodiments, a flow (e.g., flow(s) (309)) is a visual representation of network traffic between any application (310, 311), application component (312, 314), network device, network (306), or client (308) (a "source component") and another one of those components (a "destination component"). In one or more embodiments, a flow (309) provides visual and/or interactive elements of traffic between the source component(s) and the destination component(s) related to a policy (e.g., using the data of the policy entry associated with that policy in the policy table). A flow (309) may appear as a line connecting a source component and a destination component (as identified by the source identifier and destination identifier, respectively). Further, a line may have varying appearance based on the data of the associated policy entry.

As a non-limiting example, the line may be colored depending on the status of an associated policy entry. If the status is a "success status", the line may be colored green. If the status is a "failed status", the line may be colored red. As more non-limiting examples, the line may be solid, dashed, flashing, changing colors, etc. based on the status, the source/destination entity, or any other data of the policy entry.

In one or more embodiments, the numbered elements of the policy map user interface (307) may be interactive (i.e., interactive components). That is, a user of the policy map user interface (307) may be able to click (e.g., via mouse, touchscreen, keyboard, etc.) or hover-over (e.g., move the mouse on top of) an interactive component and receive more information about that component. As a non-limiting example, a user may click on a flow (309) and a window may popup (e.g., flow information (309.1)) providing the data stored in the associated policy entry. As another non-limiting example, a user may click on a client (or group of clients) (308) and a window may popup (e.g., client information (308.1)) that provides information about those client(s) (e.g., hostname, IP address, activity with an application component (312), notes, etc.).

In one or more embodiments, using the policy map user interface (307), a user may modify existing policies by clicking on a flow, being presented with editable fields (e.g., the policy identifier, source identifier, destination identifier, and/or input), then modifying any one of the available properties. Additionally, in one or more embodiments, a user may generate a new policy (e.g., by selecting two entities and clicking a "New Policy" button). Similarly, the user may be presented with editable fields (e.g., the policy identifier, source identifier, destination identifier, and/or input), then enter information for any one of the available properties. In either instance, the policy manager informs the application of the updated/new policy and commands the application to make the requested changes.

In one or more embodiments, a policy map user interface (307) is configured to shift focus away from a currently displayed application (310) to another application (311). For example, a user may click on an external application (311) and the policy map user interface (307) may reconfigure (e.g., move, remove, add visual elements) to provide focus to the newly clicked application (311) (where application (310) is shown in FIG. 3). Further, all of the flows (309) and other components would be updated relevant to the newly-focused-on external application (311).

While FIG. 3 shows a specific configuration of a system, other configurations may be used without departing from the scope. Accordingly, embodiments disclosed herein should not be limited to the configuration of devices and/or components shown in FIG. 3.

Figure 4:
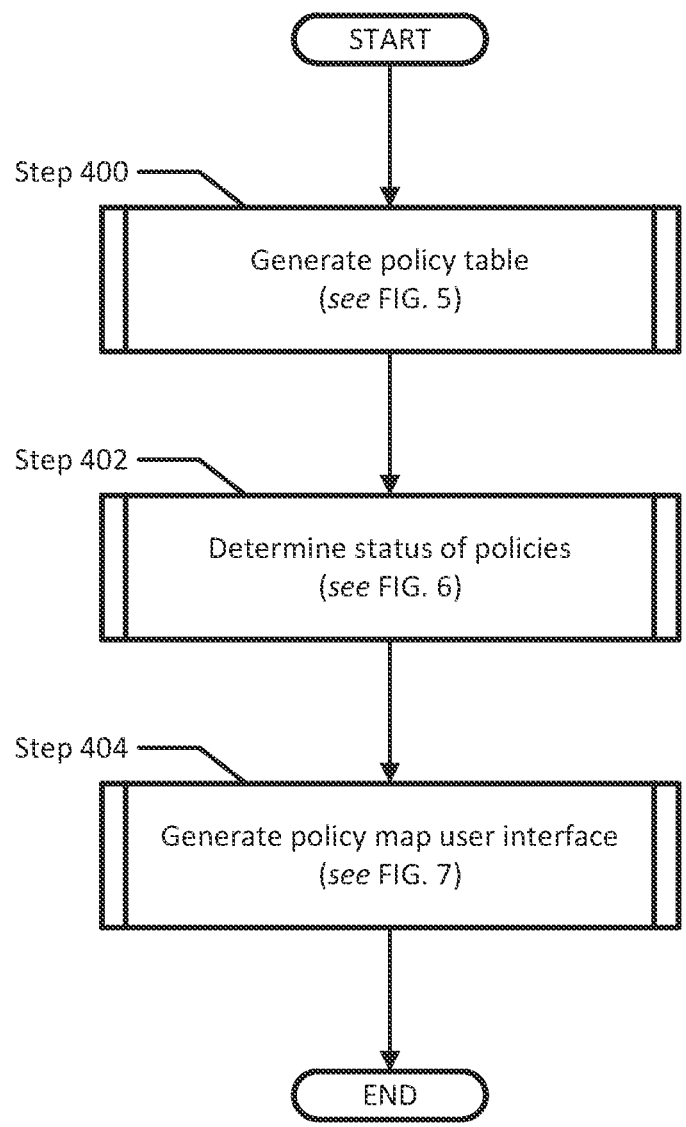
FIG. 4 shows a flowchart of a method of generating a policy table and policy map user interface, in accordance with one or more embodiments.

FIG. 4 shows a flowchart of a method of generating a policy table and policy map user interface, in accordance with one or more embodiments. All or a portion of the method shown in FIG. 4 may be performed by one or more components of the policy manager. However, another component of the system may perform this method without departing from one or more embodiments. While the various steps in this flowchart are presented and described sequentially, one of ordinary skill in the relevant art will appreciate that some or all of the steps may be executed in different orders, may be combined or omitted, and some or all steps may be executed in parallel.

In Step 400, a policy manager generates a policy table. Additional details regarding the generation of a policy table may be found in the description of FIG. 5.

In Step 402, the policy manager determines the status of one or more policies. In one or more embodiments, the policy manager attempts to determine if policies have been successfully implemented (i.e., validate those policies). Additional details regarding the validation of policies may be found in the description of FIG. 6.

In Step 404, the policy manager generates a policy map user interface. Additional details regarding the generation of a policy map user interface may be found in the description of FIG. 7.

Figure 5:
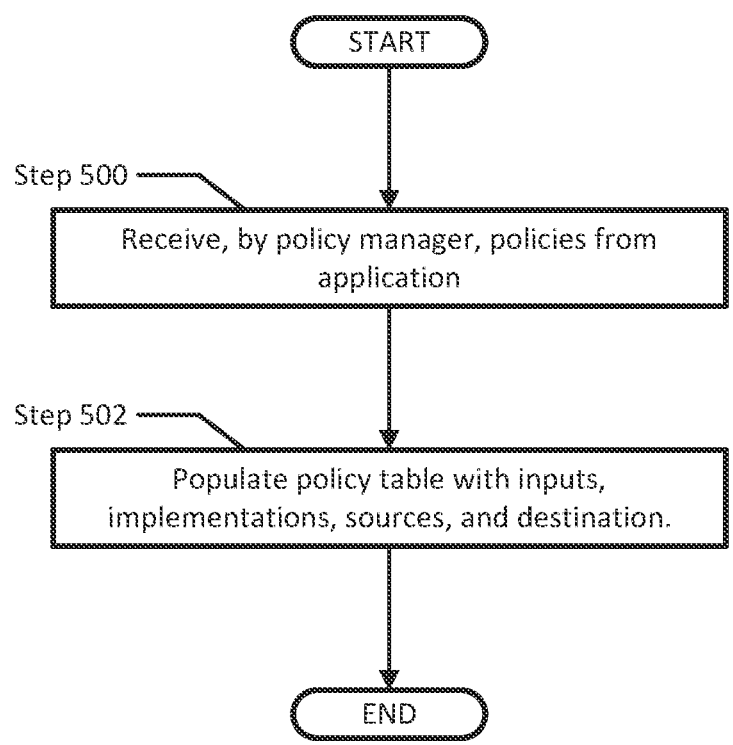
FIG. 5 shows a flowchart of a method of generating a policy table, in accordance with one or more embodiments.

FIG. 5 shows a flowchart of a method of generating a policy table, in accordance with one or more embodiments. All or a portion of the method shown in FIG. 5 may be performed by one or more components of the policy manager. However, another component of the system may perform this method without departing from one or more embodiments. While the various steps in this flowchart are presented and described sequentially, one of ordinary skill in the relevant art will appreciate that some or all of the steps may be executed in different orders, may be combined or omitted, and some or all steps may be executed in parallel.

In Step 500, a policy manager receives policy data from one or more application(s). The policy data received from the application may include some or all of the data included in a policy entry (except the status). As a non-limiting example, an application may provide the settings as configured by a user (i.e., the input), the actual configuration of the application (i.e., the implementation), and with what entities the policy applies (i.e., the source identifier and/or destination identifier). In one or more embodiments, the policy manager may initially request the policy data, or the application may send it unrequested. In one or more embodiments, the policy manager may periodically poll one or more application(s) to receive updated policy data (for new, modified, deleted policies). Further, in one or more embodiments, if the policy manager is used to create a new policy, modify an existing policy, and/or delete a policy (e.g., via the policy map user interface), the policy manager may initiate a request to receive the policy data (instead of waiting for a subsequent polling of the policy data).

In Step 502, the policy manager generates a policy table (if one does not already exist) then populates the policy table with the data received in Step 500. In one or more embodiments, a new policy entry is generated for each unique combination of received inputs, implementations, source entities, and destination entities.

The process of FIG. 5 may repeat for each entity operatively connected to the application (and the application components therein). Policy entries may be added to a single policy table and/or the policy entries may be added to different policy tables that are unique to each application.

Figure 6:
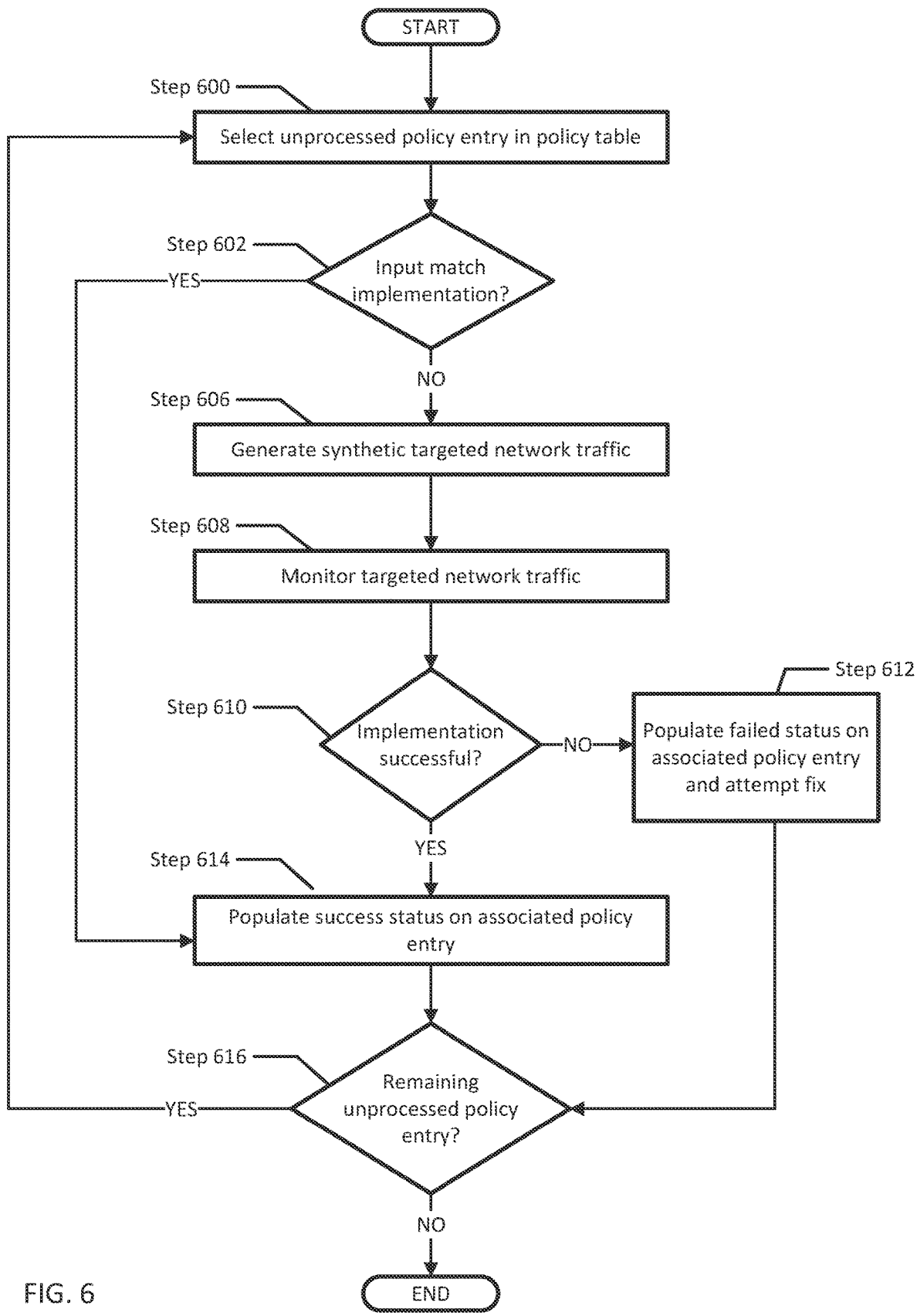
FIG. 6 shows a flowchart of a method of validating policies, in accordance with one or more embodiments.

FIG. 6 shows a flowchart of a method of validating policies, in accordance with one or more embodiments. All or a portion of the method shown in FIG. 6 may be performed by one or more components of the policy manager. However, another component of the system may perform this method without departing from one or more embodiments. While the various steps in this flowchart are presented and described sequentially, one of ordinary skill in the relevant art will appreciate that some or all of the steps may be executed in different orders, may be combined or omitted, and some or all steps may be executed in parallel.

In Step 600, the policy manager selects a policy entry in the policy table that has yet to be processed by the policy manager. In one or more embodiments, the policy manager may identify and select an unprocessed policy entry by failing to locate a tag associated with the policy entry (a tag indicating a processed status of the policy entry). In one or more embodiments, the policy manager may maintain a separate data structure that tracks the processing of policy entries (e.g., by their policy identifier). In one or more embodiments, a policy entry may be considered "unprocessed" if the policy entry has changed (e.g., modified, updated) since the last time the policy entry was processed.

In Step 602, the policy manager makes a determination if the input (of the policy entry) matches the implementation. In one or more embodiments, a policy manager compares the data of the input (how the user input the policy into the application) to the implementation of the policy (how the application is actually configured). In one or more embodiments, a policy manager is able to identify if the input and implementation match by comparing the properties of each (e.g., "block traffic to Device A" and "block traffic to Device B" do not match, whereas "throttle traffic 80% to Dev C" and "throttle traffic 80% to Dev C" do match).

In one or more embodiments, if the input and implementation match (602—YES), the method proceeds to Step 614. However, if the input and implementation do not match (602—NO), the method proceeds to Step 606.

In Step 606, the policy manager generates synthetic targeted network traffic to test the implementation of the policy. In one or more embodiments, the policy manager generates synthetic targeted network traffic by generating network packets that satisfy the condition(s) of the input. As a non-limiting example, if the input is to "block traffic from Device A to Database B", the policy manager may generate network packets that appears to be from Device A (e.g., spoofing one or more portion(s) of the packet header) and addressed to Database B. Additionally, the policy manager may send a request to Device A to generate network packets addressed to Database B. Accordingly, the synthetically generated network traffic satisfies the conditions of the input and is therefore "targeted network traffic".

In one or more embodiments, synthetic targeted network traffic is not generated. Instead, targeted network traffic is generated organically without the intervention of the policy manager.

In one or more embodiments, Step 606 may be initiated by a user of the policy map user interface. A user may interact (e.g., click) on a flow and (regardless of the policy entry status) initiate the generation and observation of synthetic targeted network traffic. In one or more embodiments, where a user initiates the process starting at Step 606, the process may exclude Step 616.

In Step 608, the policy manager monitors the flow of the targeted network traffic. In one or more embodiments, network traffic is monitored via one or more protocols (e.g., simple network management protocol (SNMP), security information and event management (SIEM), deep packet inspection (DPI), IP flow information export (IPFIX) protocol, etc.) which may utilize one or more methods of network packet tracing, identification, and analysis. In one or more embodiments, the policy manager may monitor the flow of the targeted network traffic to observe if the action of the input is performed against the targeted network traffic (e.g., does the traffic from Device A arrive at Database B, or is it blocked).

In Step 610, the policy manager makes a determination if the implementation of the policy was successful based on the observation of Step 608. If the observation reveals that the action (of the input) is performed on the targeted network traffic (and only the targeted network traffic), the implementation is therefore successful (610—YES), and the method proceeds to Step 614. However, if the observation fails to show that the action is performed on the targeted network traffic (or is performed on the targeted network traffic in addition to non-targeted network traffic), the implementation is therefore not successful (610—NO), and the method proceeds to Step 612.

In Step 612, the policy manager populates the status of the policy entry with a "failed status". As the input did not match the implementation (602—NO) and the policy manager failed to observe an input action performed on targeted network traffic (610-NO), the policy is deemed to not be implemented correctly (or at all) and therefore has "failed".

In one or more embodiments, the policy manager attempts to fix the implementation by requesting the application modify the policy to correct the issue identified (or re-attempt to commit the policy). If modified as requested, the policy entry may be updated and re-checked via the process of FIG. 6.

In one or more embodiments, the policy manager notifies a user of the failed status (i.e., generates a notification). As a non-limiting example, the policy manager may generate a popup window on the policy map user interface providing some or all of the policy entry information to a user. As another non-limiting example, the policy manager may be configured to send an email to a specific address when the validation of a policy has failed.

In Step 614, the policy manager populates the status of the policy entry with a "success status". As the action (of the input) was observed being successfully performed on the targeted network traffic (610—YES) the status can be updated to indicate the successful application of the policy input. Further, the policy manager may update the implementation of the policy entry to match the input.

In Step 616, the policy manager makes a determination if there are any remaining unprocessed policy entries. In one or more embodiments, the policy manager may determine if there are any unprocessed entries by locating (or failing to locate) a tag on each policy entry. If the tag is present, the policy entry is considered processed, and if the tag is absent, the policy entry is considered unprocessed. In one or more embodiments, the policy manager may maintain a separate data structure to track the processing of the policy entries and may use that other data structure to determine if there are additional policy entries that have yet to be processed.

In one or more embodiments, if there are any remaining unprocessed policy entries (616—YES), the method returns back to Step 600. However, if there are no remaining unprocessed policy entries (616—NO), the method may end.

Figure 7:
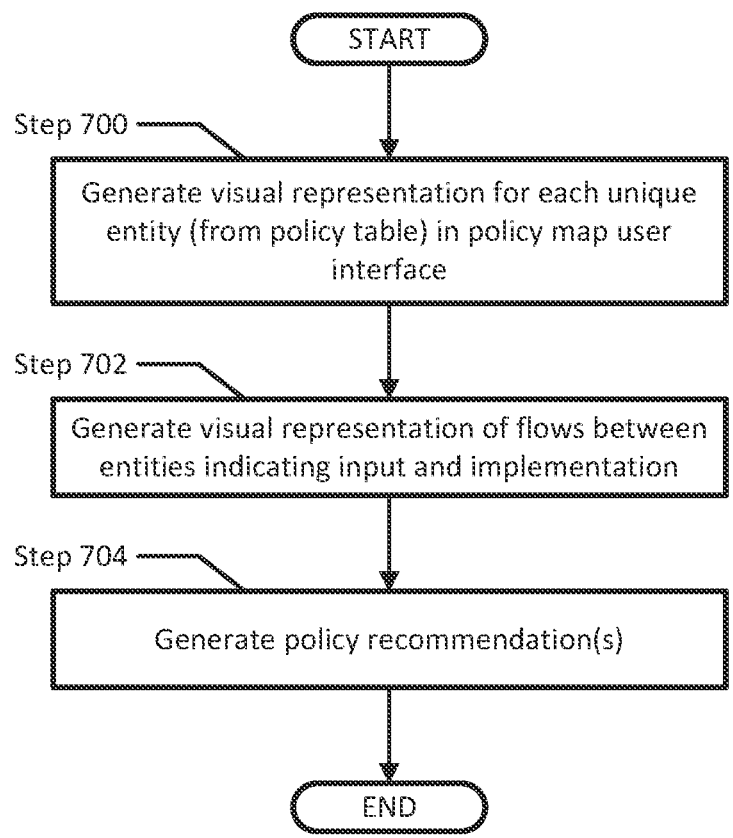
FIG. 7 shows a flowchart of a method of generating a policy map user interface, in accordance with one or more embodiments.

FIG. 7 shows a flowchart of a method of generating a policy map user interface, in accordance with one or more embodiments. All or a portion of the method shown in FIG. 7 may be performed by one or more components of the policy manager. However, another component of the system may perform this method without departing from one or more embodiments. While the various steps in this flowchart are presented and described sequentially, one of ordinary skill in the relevant art will appreciate that some or all of the steps may be executed in different orders, may be combined or omitted, and some or all steps may be executed in parallel.

In Step 700, the policy manager reads the policy table and identifies each unique source and destination entity (i.e., using the source identifiers and destination identifiers). In one or more embodiments, if the policy table includes policy entries for more than one application, the policy manager may identify and select one specific application and filter to the policy entries associated with that application (and the application components thereof). Accordingly, only the unique entities relevant to that selected application will have their visual representation generated.

In one or more embodiments, if the policy map user interface has not yet been created, the policy manager creates the policy map user interface. The policy manager then generates a visual representation of the selected application (the focus of the policy map user interface) and a visual representation of each unique entity in the policy map user interface.

In Step 702, the policy manager generates a flow for each policy entry read in Step 700. In one or more embodiments, the policy manager generates the flows as visual connections (e.g., lines) between the source and destination entities indicated in each policy entry. The policy manager may then alter the color, shape, size, animation, and/or behavior of the flows based on the status of the associated policy entry.

As discussed in the description of FIG. 3, as a non-limiting example, the policy manager may make flows green if their associated policies are valid (have success statuses), yellow if unknown, or red if failed. Further, the policy manager may continually read the policy table such that if a new policy entry is added, or a policy entry is updated, the associated flow visualization will similarly be updated. Further, as discussed in the description of FIG. 3, the policy manager may make flows interactive so that a user can click on the flow and quickly reveal the policy identifier, source identifier, destination identifier, input, implementation, status, or any combination thereof.

In one or more embodiments, if the number of visual representations is sufficiently large (where the user interface would be crowded and difficult to understand), the policy manager may represent each entity as a smaller size and/or hide certain entities to reduce the clutter of the policy map user interface.

In Step 704, the policy manager generates policy recommendations. In one or more embodiments, a policy recommendation is a proposed modification to a policy. A policy recommendation may include a proposed modification to a condition, an action, and/or an implementation, generally.

In one or more embodiments, a policy recommendation is based on a policy entry in the policy table. The policy manager may be configured to identify policies (described in the policy table) that conflict with a broader policy applied to the larger system. In turn, the policy manager may generate a policy recommendation and provide it to a user (e.g., via the policy map user interface, email, etc.). A policy recommendation provided via the policy map user interface may show a visual indicator of the policy (i.e., via the associated flow), provide some description of the proposed modification, and some interactive element to allow the user to apply the policy recommendation (which, when appropriately interacted with, causes the policy manager to apply the policy recommendation).

In one or more embodiments, the policy manager may automatically apply a policy recommendation. The policy manager may be configured to automatically apply a policy recommendation if the policy is considered a considerable threat to the system's security (e.g., open ports, default passwords, etc.). Alternatively, the policy manager may be configured to automatically apply all policy recommendations regardless of type. In any case, the policy manager may provide a notification to a user that a policy was automatically modified and may further include any details about that modification.

As a first non-limiting example, in a scenario where a "zero-trust" security model is applied to an entire network, the policy manager may identify conflicting policies and recommend that those policies be modified. Accordingly, if there is a policy to always allow a certain client (e.g., via MAC address) to access a directory in a database, the policy manager may recommend disallowing that type of access (i.e., disabling that policy).

As a second non-limiting example, if a new application is installed, the application, by default, may allow for secure shell (SSH) protocol interfacing (with default credentials) and further, by default, leave port 22 exposed. If the policy manager is configured to automatically enforce a "zero-trust" security model, the policy manager may modify the application to close port 22 (and/or otherwise disable SSH access).

FIG. 8 shows an example of a policy table, in accordance with one or more embodiments. The following use case is for explanatory purposes only and not intended to limit the scope to this embodiment. The example policy table (820) includes a series of policy entries (822) (policy entry A (822A), policy entry B (822B), policy entry C (822C), policy entry D (822D), policy entry E (822E), policy entry F (822F)), each with a corresponding policy identifier (830), source identifier (832), destination identifier (834), input (836), implementation (838), and status (840).

Figure 9:
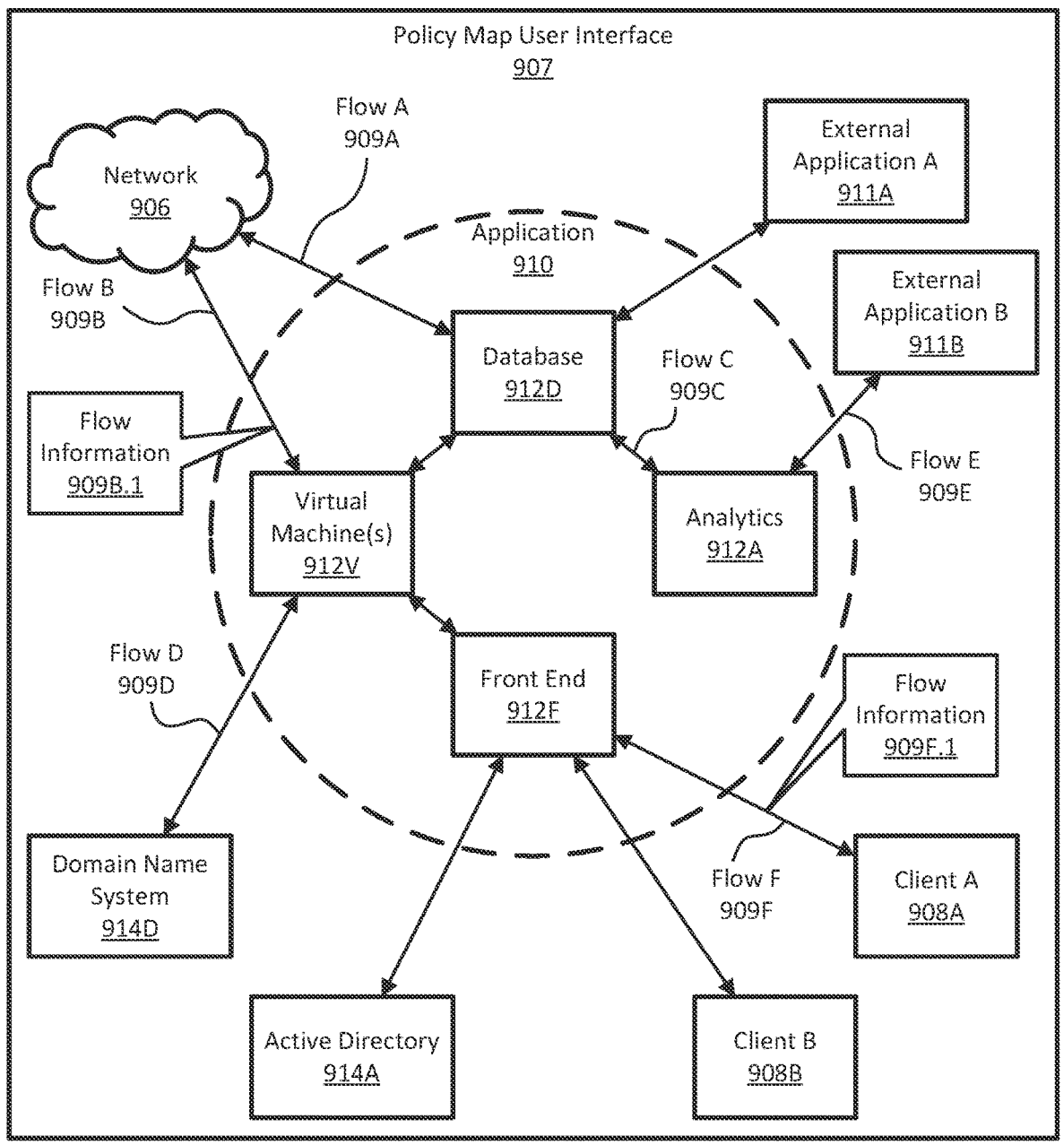
FIG. 9 shows an example of a policy map user interface in accordance with one or more embodiments.

Each policy entry (822A-F) in the example policy table (820) of FIG. 8 is used in example FIG. 9. Accordingly, please see the description of FIG. 9 for an explanation of each policy entry (822A-F).

FIG. 9 shows an example of a policy map user interface in accordance with one or more embodiments. The following use case is for explanatory purposes only and not intended to limit the scope to this embodiment. In FIG. 9, consider a scenario in which an application (910) is the focus of the policy map user interface (907). The application (910) includes four application components—analytics (912A), database (912D), virtual machine(s) (912V), and a front end (912F). Further, analytics (912A) is shown operatively connected to the database (912D) via flow C (909C) and the virtual machine(s) (912V) are shown to be operatively connected to the domain name system (914D) via flow D (909D).

Around the application, there is a visual representation of a network (906), a domain name system (914D), active directory (914A), client A (908A), client B (908B), external application A (911A), and external application B (911B). Further, network (906) is operatively connected to database (912D) via flow A (909A). Network (906) is also connected to virtual machine(s) (912V) via flow B (909B). Client A (908A) is connected to front end (912F) via flow F (909F), and external application B (911B) is connected to analytics (912A) via flow E (909E).

Further, to reduce clutter in FIG. 9, no overlapping flows are shown and multiple flows between entities are not shown. Additionally, although not labeled, each double-sided arrow in FIG. 9 is an example flow, however only the labeled flows will be discussed here.

For flow A (909A), the corresponding policy entry (policy entry A (822A) of FIG. 8) includes an input (836) specifying that any communication from network (906) with an IP address in the range 45.13.13.1-255 (45.13.13.0/24) should not be allowed to communicate with "DB_8" of the database (912D) (i.e., "any traffic, block"). Further, the implementation (838) of the policy entry similarly specifies "any traffic, block". Accordingly, the policy is considered to be successfully implemented, and the policy manager therefore provides a status (840) of "success" and gives flow A (909A) a solid green appearance on the policy map user interface (907).

For flow B (909B), the corresponding policy entry (policy entry B (822B) of FIG. 8) includes an input (836) specifying that any SSH communication for port 22 from network (906) should be allowed to communicate with "VM_1" of the virtual machine(s) (912V) (i.e., "SSH traffic, port 22, allow"). Further, the implementation (838) of the policy entry similarly specifies "SSH traffic, port 22, allow". Accordingly, the policy is considered to be successfully implemented, and the policy manager therefore provides a status (840) of "success". However, the policy manager is configured to identify that open ports violate a broader "zero trust" model and therefore the policy manager generates a recommendation to delete the policy. The policy manager generates a popup (flow information (909B.1)) that informs the user that port 22 is open for SSH traffic and that the policy should be deleted. Further, in flow information (909B.1), there is an "Apply" button (not shown) that when clicked by the user, causes the policy manager to delete the policy of VM_1. Despite the "success" status (840), the policy manager gives flow B (909B) a flashing red appearance on the policy map user interface (907) due to the "zero trust" model enforcement configuration.

For flow C (909C), the corresponding policy entry (policy entry C (822C) of FIG. 8) includes an input (836) specifying that communication from the "Analytics" application component (Analytics (912A)) to "DB_2" of the database (912D) should be throttled to five megabytes per second (i.e., "Data, 5 MB/s"). However, the implementation (838) of the policy entry is empty (shown as "null"). Accordingly, the policy is considered to have failed implementation, and the policy manager therefore provides a status (840) of "failed" and gives flow C (909C) a dashed red appearance on the policy map user interface (907).

For flow D (909D), the corresponding policy entry (policy entry D (822D) of FIG. 8) includes an input (836) specifying that communication from any virtual machine "All VMs" of virtual machine(s) (912V) to any domain name system (914D) ("All DNSs") should block all ports except port 53 ("All ports (ex. 53), reject"). Initially, the implementation (838) of the policy entry is empty (shown as "null"). However, the policy manager generates synthetic targeted network traffic that attempts to communicate from multiple virtual machine(s) (912V) to multiple domain name system(s) (914D) using different ports (including port 53 and other ports). The policy manager observes the targeted network traffic and identifies that only network traffic addressed to port 53 of the domain name system(s) (914D) successfully traverses the operative connection. Accordingly, the policy manager updates the implementation (838) to "All ports (ex. 53), reject" (same as input (836)), provides a status (840) of "success", and gives flow D (909D) a solid green appearance on the policy map user interface (907).

For flow E (909E), the corresponding policy entry (policy entry E (822E) of FIG. 8) includes an input (836) specifying that communication from the "AppB" (i.e., External Application B (911B)) to the "Analytics" application component (Analytics (912A)) should be blocked ("Any traffic, block"). However, the implementation (838) of the policy entry specifies that only HTTPS traffic over port 443 is blocked ("HTTPS (port 443), block"). Accordingly, the policy is considered to have failed implementation, and the policy manager therefore provides a status (840) of "failed" and gives flow E (909E) a dashed red appearance on the policy map user interface (907). Further, the policy manager generates an email to a user informing the user that the policy failed validation. Further, in the email, the policy manager generates and provides a link that, when clicked, initiates the generation of synthetic targeted network traffic to determine if the policy is successfully implemented.

For flow F (909F), the corresponding policy entry (policy entry F (822F) of FIG. 8) includes an input (836) specifying that communication from "Client A" (908A) to a "Payroll" interface of front end (912F) should be limited to business hours ("Any traffic, 8 am-5 pm, allow"). Initially, the implementation (838) of the policy entry matches the ("Any traffic, 8 am-5 pm, allow") and the status (840) is set to success. However, a user of the policy map user interface (907) clicks on flow F (909F) to open flow information (909F.1). Inside the popup, there is a button with text reading "Test Policy" (not shown). When clicked by the user, the policy manager initiates the generation of synthetic targeted network traffic to determine if the policy is successfully implemented. Upon completion of the observation of the synthetic targeted network traffic (generated at 10 pm at night), the policy manager identifies that network traffic is permitted between Client A (908A) and the front end (912F), despite the policy. Accordingly, the policy manager updates the implementation (838) to reflect the actual implementation ("Any traffic, 10 pm, allow") which does not match the input (836). Accordingly, the policy manager updates the status (840) to "failed" and gives flow F (909F) a dashed red appearance on the policy map user interface (907).

As articulated above, specific embodiments are described with reference to the accompanying figures. In the preceding description, numerous details were set forth as examples. One of ordinary skill in the art, having the benefit of this detailed description, would appreciate that one or more embodiments described above may be practiced without the explicitly articulated details, and that numerous variations or modifications may be possible without departing from the scope. Certain details known to those of ordinary skill in the art may be omitted to avoid obscuring the description.

In the preceding description of the figures, any component described with regard to a figure, in various embodiments, may be equivalent to one or more like-named components shown and/or described with regard to any other figure. For brevity, descriptions of these components were not repeated with regard to each figure. Thus, each and every embodiment of the components of each figure is incorporated by reference and assumed to be optionally present within every other figure having one or more like-named components. Additionally, in accordance with various embodiments, any description of any component of a figure is to be interpreted as an optional embodiment, which may be implemented in addition to, in conjunction with, or in place of the embodiments described with regard to a corresponding like-named component in any other figure.

Throughout this application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired connection or wireless connection directly between two devices) or indirect (e.g., wired and/or wireless connections between any number of devices connecting the operatively connected devices) connection.

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for updating a policy by a policy manager, comprising:
   selecting, by the policy manager, a policy entry in the policy that comprises an input representative of user-specified criteria to identify network traffic and an implementation representative of actual criteria, to identify network traffic;
   determining whether or not to perform a validation of the policy entry by comparing the user-specified criteria of the policy entry and the actual criteria of the policy entry;
   in response to the user-specified criteria matching the actual criteria of the policy entry, updating the policy entry with a successful status without performing a validation of the policy and storing the updated policy entry in the policy; and
   in response to the user-specified criteria not matching the actual criteria of the policy entry:
      performing a validation of the policy entry;
      updating the policy entry with a status based on the validation; and
      storing the updated policy entry in the policy.

2. The method of claim 1, wherein performing the validation on the policy entry comprises:
   generating synthetic targeted network traffic that matches a condition of the input; and
   making an observation that the synthetic targeted network traffic is routed in violation of an action of the input.

3. The method of claim 2, wherein performing the validation on the policy entry further comprises:
   making a second observation that organically-generated targeted network traffic is routed in violation of the action of the input.

4. The method of claim 1, wherein after updating the policy entry, the method further comprises:
   performing a second validation on the policy entry; and
   making a second determination, based on the second validation, that the implementation was successful.

5. The method of claim 1, wherein when the validation is not successful, the method further comprises:
   modifying the status of the policy entry to a failed status.

6. The method of claim 5, wherein after modifying the status of the policy entry to the failed status, the method further comprises:
   generating a policy map user interface with a flow, wherein the flow is a visual representation of the policy entry.

7. The method of claim 6, wherein after generating the policy map user interface, the method further comprises:
   generating, on the policy map user interface, a notification that indicates that the implementation of the policy was not successful.

8. The method of claim 7, wherein after generating the notification that indicates that the implementation of the policy was not successful, the method further comprises:
   receiving an updated policy entry;
   performing a second validation on the updated policy entry; and
   making a second determination, based on the second validation, that the implementation was successful.

9. A method for updating a policy by a policy manager, comprising:
   generating, by the policy manager, a policy map user interface with a plurality of flows, wherein each flow is a visual representation of a corresponding policy entry associated with the policy, wherein the flow has an appearance that indicates whether user-specified criteria of the corresponding policy entry matches or does not match actual implemented criteria of the corresponding policy entry;
   in response to the user-specified criteria matching the actual implemented criteria of the policy entry, updating the flow in the policy map user interface to indicate a success status of the policy entry, without performing a validation of the policy entry; and
   in response to the user-specified criteria not matching the actual implemented criteria of the policy entry, initiating a validation of the policy entry, wherein the validation comprises:
      generating synthetic targeted network traffic that matches a condition of the policy entry;

making an observation that the synthetic targeted network traffic is routed in violation of an action of the policy entry; and updating the flow in the policy map user interface, based on the observation, to indicate a failed status of the policy entry.

10. The method of claim 9, wherein after updating the flow, the method further comprises:

generating, on the policy map user interface, a notification that indicates that an implementation of the policy was not successful.

11. The method of claim 10, wherein after generating the notification, the method further comprises:

attempting to fix the policy by recommitting the policy.

12. The method of claim 11, wherein after attempting to fix the policy, the method further comprises:

initiating a second validation of the policy entry.

13. A computing network, comprising:

memory;

a policy manager;

a processor, wherein the processor is configured to perform a method for updating a policy by the policy manager, comprising:

selecting a policy entry in the policy that comprises an input representative of user-specified criteria to identify network traffic and an implementation representative of actual criteria, implemented in the network device, to identify network traffic;

determining whether or not to perform a validation of the policy entry by comparing the user-specified criteria of the policy entry and the actual criteria of the policy entry;

in response to the user-specified criteria matching the actual criteria of the policy entry, updating the policy with a successful status without performing a validation of the policy entry and storing the updated policy entry in the policy; and in response to the user-specified criteria not matching the actual criteria of the policy entry, performing a validation of the policy entry, wherein the validation comprises:

making an observation that synthetic targeted network traffic is routed in violation of an action of the input; and updating the policy, based on the observation, to match the input.

14. The computing device of claim 13, wherein prior to making the observation, performing the validation on the policy entry further comprises:

generating the synthetic targeted network traffic that matches a condition of the input.

15. The network computing device of claim 14, wherein performing the validation on the policy entry further comprises:

making a second observation that organically-generated targeted network traffic is routed in accordance with the action of the input.

16. The computing device of claim 13, wherein after updating the policy, the method further comprises:

performing a second validation on the policy entry; and making a second determination, based on the second validation, that the implementation was successful.

17. The computing device of claim 13, wherein after making the first determination that the implementation was not successful, the method further comprises:

modifying a status of the policy entry to a failed status.

18. The computing device of claim 17, wherein after modifying the status of the policy entry to the failed status, the method further comprises:

generating a policy map user interface with a flow, wherein the flow is a visual representation of the policy entry.

19. The computing device of claim 18, wherein after generating the policy map user interface, the method further comprises:

generating, on the policy map user interface, a notification that indicates that the implementation of the policy was not successful.

20. The computing device of claim 13, wherein after updating the policy to match the input, the method further comprises:

receiving an updated policy entry associated with the updated policy;

performing a second validation on the updated policy entry; and making a second determination, based on the second validation, that the implementation was successful.

* * * * *